(12) United States Patent  
Schmied

(10) Patent No.: US 7,614,369 B2
(45) Date of Patent: Nov. 10, 2009

(54) RECIPROCATING CYLINDER ENGINE

(75) Inventor: Walter Schmied, Bonners Ferry, ID (US)

(73) Assignee: MotorPat, L.L.C., Rosemount, MN (US)

( * ) Notice: Subject to any disclaimer, the term of this patent is extended or adjusted under 35 U.S.C. 154(b) by 47 days.

(21) Appl. No.: 11/433,635

(22) Filed: May 12, 2006

(65) Prior Publication Data

US 2007/0107679 A1    May 17, 2007

Related U.S. Application Data

(60) Provisional application No. 60/681,574, filed on May 13, 2005.

(51) Int. Cl.
F02B 75/22    (2006.01)
(52) U.S. Cl. .................................... 123/55.7; 123/70 R
(58) Field of Classification Search ................. 123/561, 123/70 R, 55.7, 62, 74 A, 190.14, 73 V, 3, 123/543, 74 D, 193.4, 54.3, 54.1, 44 R, 51 B, 123/48 A, 78 A, 74 B, 559.1, 559.2; 60/620, 60/716, 39.6, 626, 595; 137/56; 92/212; 29/888.048
See application file for complete search history.

(56) References Cited

U.S. PATENT DOCUMENTS

| 722,629 | A | * | 3/1903 | Riotte et al. ................... 123/21 |
| 1,019,856 | A | | 3/1912 | Strickland |
| 1,215,383 | A | * | 2/1917 | Kenyon ...................... 123/55.7 |
| 2,455,245 | A | | 11/1948 | Francis |
| 2,957,304 | A | * | 10/1960 | Berchtold ..................... 60/595 |
| 3,285,503 | A | | 11/1966 | Bancroft |
| 3,603,331 | A | * | 9/1971 | Tanner ......................... 137/56 |
| 3,931,809 | A | | 1/1976 | Corte |
| 4,011,842 | A | | 3/1977 | Davies |
| 4,058,088 | A | | 11/1977 | Brown |
| 4,096,835 | A | | 6/1978 | Lamont |
| 4,108,118 | A | * | 8/1978 | George ..................... 123/41.57 |
| 4,331,108 | A | | 5/1982 | Collins |
| 4,715,326 | A | * | 12/1987 | Thring .......................... 123/3 |
| 4,838,214 | A | | 6/1989 | Barrett |
| 5,097,808 | A | | 3/1992 | Tanaka |

(Continued)

FOREIGN PATENT DOCUMENTS

EP    0119721 B1    1/1988

(Continued)

*Primary Examiner*—Stephen K Cronin
*Assistant Examiner*—Keith Coleman
(74) *Attorney, Agent, or Firm*—Christensen O'Connor Johnson Kindness PLLC

(57) ABSTRACT

An engine is disclosed having cylinders slidably disposed in an engine block. The cylinders reciprocate, engaging movable pistons at each end. A piston and cylinder end define a combustion chamber. A centrally located crankshaft extracts work, and converts the reciprocating motion into rotary motion. Precompression plates fixed to the cylinder reciprocate in precompression chambers to pre-compress and inject an air/fuel mixture. An exhaust gas recovery system, including a catalytic converter in the precompression chamber, extracts work from energy in the exhaust gas stream to improve the engine efficiency. In one embodiment, a central piston assembly is slidable within the cylinder, and reciprocates relative to the cylinder, substantially in synchrony with the motion of the cylinder, thereby producing an effective stroke length that is greater than the stroke length of the cylinder alone. Offset piston journals engage a gliding block to couple the central piston assembly to the crankshaft.

22 Claims, 7 Drawing Sheets

U.S. PATENT DOCUMENTS

| | | | |
|---|---|---|---|
| 5,103,775 A | 4/1992 | Hue | |
| 5,195,472 A * | 3/1993 | Jacques et al. | 123/90.33 |
| 5,456,219 A | 10/1995 | Clarke | |
| 5,526,778 A | 6/1996 | Springer | |
| 5,626,106 A | 5/1997 | Erickson | |
| 5,647,307 A | 7/1997 | Clarke | |
| 5,782,213 A | 7/1998 | Pedersen | |
| 5,862,781 A * | 1/1999 | Rossle | 123/55.7 |
| 6,032,622 A | 3/2000 | Schmied | |
| 6,314,923 B1 | 11/2001 | Tompkins | |
| 6,389,814 B2 * | 5/2002 | Viteri et al. | 60/716 |
| 6,553,977 B2 * | 4/2003 | Schmitz | 123/561 |
| 6,598,567 B2 | 7/2003 | Schmied | |
| 6,820,534 B1 * | 11/2004 | Schooler | 91/395 |
| 7,121,235 B2 | 10/2006 | Schmied | |
| 7,150,259 B2 | 12/2006 | Schmied | |
| 7,219,631 B1 * | 5/2007 | O'Neill | 123/54.3 |
| 2002/0166521 A1 * | 11/2002 | Schmied | 123/51 B |

FOREIGN PATENT DOCUMENTS

| | | |
|---|---|---|
| GB | 413960 | 7/1934 |
| GB | 678361 | 9/1952 |

* cited by examiner

RECIPROCATING CYLINDER ENGINE

CROSS-REFERENCE TO RELATED APPLICATION

This application claims the benefit of U.S. Provisional Patent Application No. 60/681,574, filed on May 13, 2005, the disclosure of which is hereby expressly incorporated by reference in its entirety, and priority from the filing date of which is hereby claimed under 35 U.S.C. § 119.

BACKGROUND

Internal combustion engines convert the thermal heat of combustion of a volatile fluid into useful work. In particular, conventional internal combustion engines compress a fuel-air mixture in a combustion chamber, and then either ignite the fuel-air mixture, or compress it sufficiently for self-ignition. The combustion energy release causes the gases to expand, generating a high pressure that is used to extract useful work. In typical piston-type internal combustion engines, the expanding combustion gases push a piston that is slidably disposed within a cylindrical chamber. The piston is typically attached through connecting rods to a crankshaft, whereby the reciprocating piston motion is converted to rotational motion.

The inventor of the invention disclosed herein has developed a new class of internal combustion engine wherein one or more cylinders reciprocate relative to oppositely-disposed pistons. Particular aspects and embodiments of this new class of IC engine are disclosed in U.S. Pat. Nos. 6,032,622; 6,598,567; U.S. patent application Ser. No. 10/627,288 (U.S. Pat. Publ. No. 2004/0159291 A1); and U.S. patent application Ser. No. 10/969,362 (U.S. Pat. Publ. No. 2005/0051117 A1); all of which are hereby incorporated by reference in their entirety.

This new class of engine promises to provide improvements in thermodynamic efficiency, consequent reductions in gas emissions, and fewer moving parts. There is no question that improvements to internal combustion engines continue to be important and useful. Additional aspects, advances and improvements to the class of internal combustion engines described above are disclosed herein.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A novel internal combustion engine is disclosed having one or more, preferably two, reciprocating cylinders. The reciprocating cylinder has open ends that each form a combustion chamber, and oppositely disposed pistons are attached to the engine that slidably engage the cylinder. Sometimes the cylinders are referred to as dual-cylinders because opposite ends of the cylinders engage separate pistons, defining two combustion chambers, and could be constructed as two cylinders axially joined at one end. The cylinders preferably include intake ports near the cylinder ends, and annular compression plates that are disposed in precompression volumes, and are operable to compress the gasses for injection into the combustion chambers. In one embodiment a cam-driven exhaust valve assembly is provided for exhaust. The exhaust gasses may be channeled to the back side of the precompression plates, providing additional power to the engine and increasing efficiency. In some embodiments a catalytic converter is provided therein that functions not only to reduce undesirable emissions, but also to increase the pressure on the annular compression plates, further improving engine performance.

In one embodiment, a central piston assembly is disposed between the oppositely disposed pistons, and is adapted to reciprocate within the cylinder, and approximately in synchrony with the cylinder, to produce a longer stroke length, without the disadvantages of a longer stroke. The central piston assembly is connected to a crankshaft having an offset piston journal through a gliding block, to produce the desired reciprocating motion.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
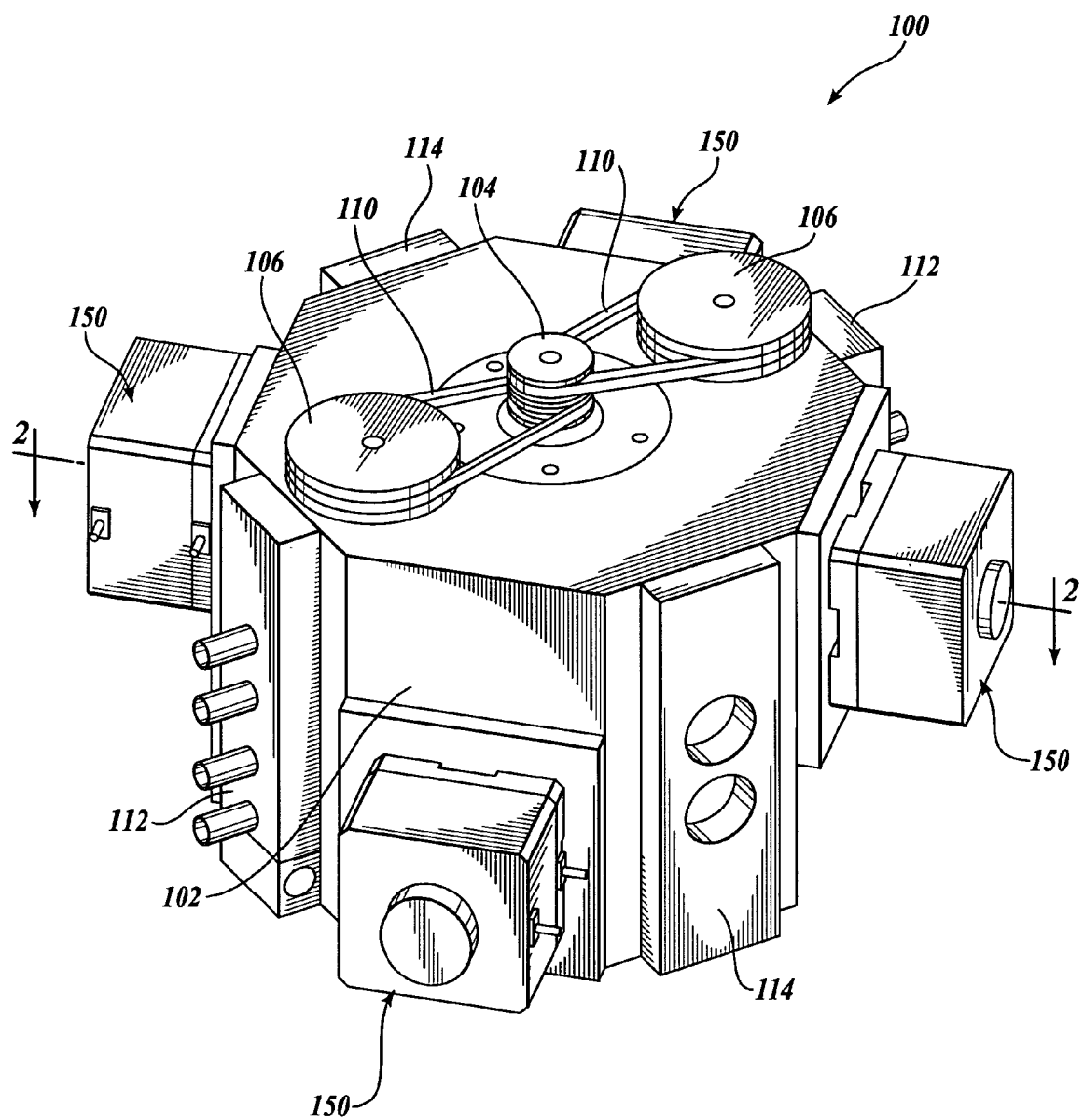
FIG. 1 is a perspective view of a reciprocating cylinder engine in accordance with the present invention.

Referring now to the FIGURES, wherein like numbers indicate like parts. FIG. 1 shows a perspective view of an internal combustion engine 100 in accordance with the present invention. The engine 100 is intended to illustrate the principles and novel aspects of the inventor's new class of engine, and it should be readily apparent to the skilled artisan that many variations to the engine 100 may be made without departing from the present invention.

The engine 100 includes an engine block 102 containing a pair of offset reciprocating dual-cylinders disposed at right angles with respect to each other and that each engage a pair of oppositely-disposed pistons as described in more detail below. Four piston assemblies 150 are provided that preferably allow the piston position to be varied, thereby selectively adjusting the compression ratio of the engine, as described in detail in the incorporated U.S. Pat. No. 6,598,567.

In the current engine 100 the piston assemblies 150 are hydraulically-actuated, although other actuation modes may be used, including electrical, pneumatic, and the like. A pair of intake manifolds 114 and a pair of exhaust manifolds 112 are also shown. The intake manifolds 114 may attach to a conventional carburetor (not shown). Other known systems for metering fuel, including for example a fuel injection system, may alternatively be used.

A drive pulley 104 is driven by the engine 100, and engages a pair of rotary valve pulleys 106 through belts 110. The belts 110 may be timing belts, chains, gears or the like. The rotary valves are described in more detail below, and in incorporated U.S. application Ser. No. 10/969,362.

Figure 2:
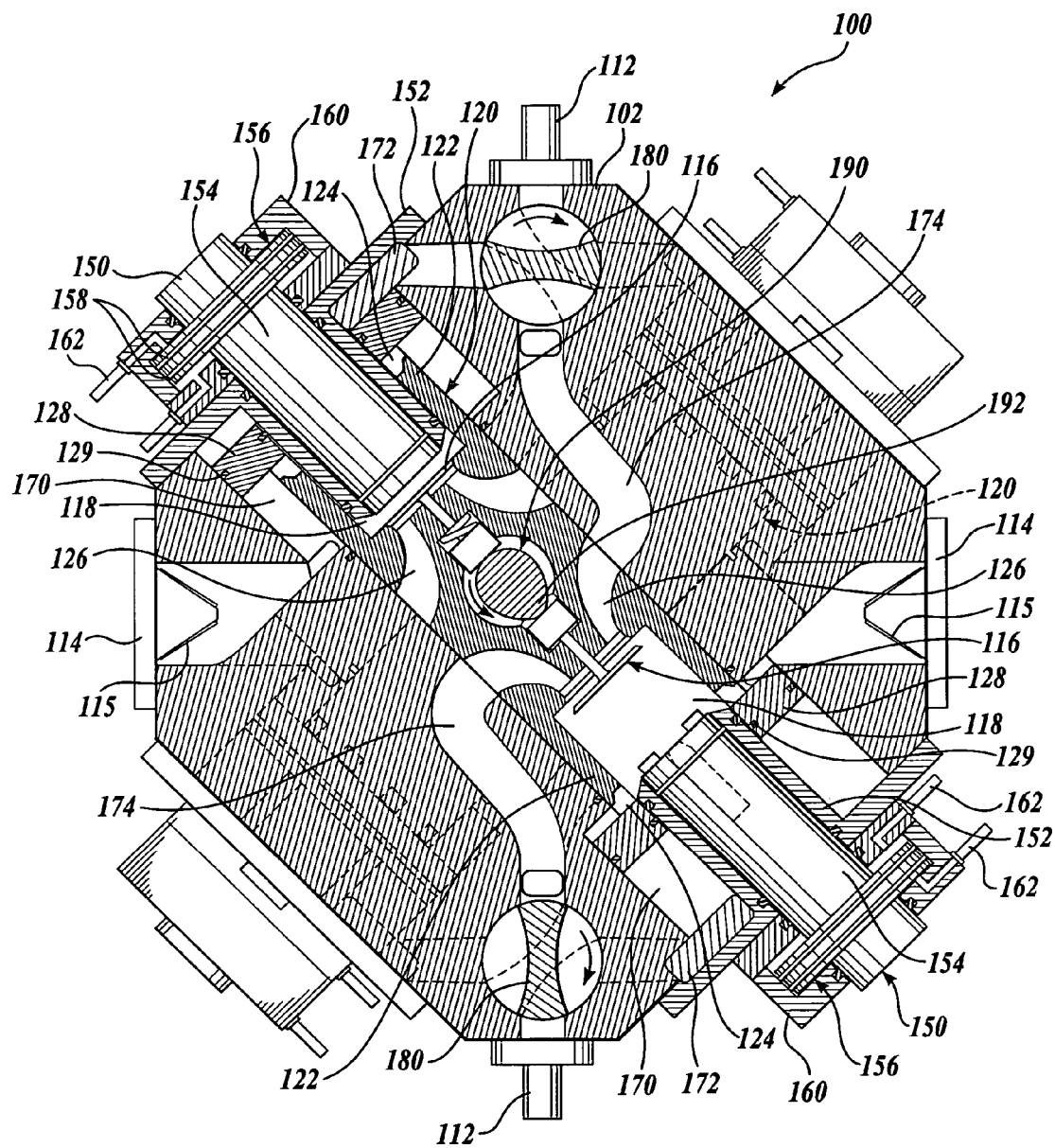
FIG. 2 is a cross sectional view of the reciprocating cylinder engine shown in FIG. 1, taken generally through 2-2.

FIG. 2 shows a cross-sectional plan view of the engine 100 through section 2-2, showing in cross-section the upper of two cylinders 120. (The lower cylinder 120 is indicated in phantom.) The first and second cylinders 120 are substantially identical in construction, and oriented transversely to each other. Although the engine 100 has two cylinders 120, it will be readily apparent that more or fewer cylinders 120 may alternatively be used without departing from the present invention.

Each cylinder 120 is slidably disposed in corresponding cylindrical apertures through the engine block 102. The cylinder 120 includes oppositely disposed open end portions 122 that slidably engages piston assemblies 150. The piston assembly 150 includes an optional liner 152 attached to the engine block 102, slidably supporting a movable piston 154. The distal end of the movable piston 154 includes a control plate 156 that is disposed within a control chamber 160, and includes a sealing mechanism, such as one or more seal rings 158, that engage the inner wall of a control chamber 160. Upper and lower hydraulic ports 162 to the control chamber 160 provide a means for controlling the axial position of the movable piston 154. It will be appreciated that this mechanism allows the engine compression ratio to be continuously adjusted, even during operation of the engine 100. It is also contemplated that the piston 154 may be adjusted using other well-known mechanisms for controlling the axial position of a piston, for example mechanical systems such as actuatable screws or the like. Although not a preferred embodiment, it will be appreciated that the engine 100 may alternatively be implemented using fixed pistons rather than the movable pistons 154.

Each piston assembly 150, in cooperation with an open end 122 of the cylinder 120, defines a combustion chamber 118. In FIG. 2, the upper left open end 122 of cylinder 120 is disposed near top dead center (TDC) with respect to the associated piston assembly 150, and the lower right open end 122 is near bottom dead center (BDC) with respect to the oppositely-disposed (lower right) piston assembly 150. Intake ports 124 are provided near the ends 122 of the cylinder 120 for injecting fuel and air into the combustion chamber 118. In the current embodiment, the intake ports 124 are circumferentially spaced apertures through the cylinder 120 that are positioned to be blocked or closed by the associated piston 154 during portions of the stroke. As seen most clearly by comparing the upper-left combustion chamber 118 (near TDC) with the lower-right combustion chamber 118 (near BDC), the intake ports 124 are closed by the piston assembly 150 during most of the cylinder stroke. For each combustion chamber 118, the intake ports 124 are open when the cylinder 120 is near BDC.

It will now be appreciated that the movable piston 154, may be controlled during operation of the engine 100. Varying the position of the movable piston 154 provides a variable compression ratio in the combustion chamber and adjusts the intake port 124 timing. Varying the position of the movable piston 154 may therefore be used to regulate the power output of the engine 100 during use.

Referring still to FIG. 2, each piston assembly 150 extends into a precompression chamber 170 provided in the engine block 102 near both ends of the cylinder 120. Air and fuel are provided to the precompression chamber 170 through an intake system including the manifold 114. An outwardly-extending flange or precompression plate 128 is fixedly attached to the cylinder 120, and extends from the cylinder 120 to the outer wall of the precompression chamber 170. The precompression plate 128 may be substantially planar, as shown in the figures, or may be piston-shaped, e.g., with a channeled rearward side. The piston-shaped precompression plate could have a smaller mass, and provide for additional available space thereabove. A sealing system such as one or more piston rings 129 are provided therebetween. As the cylinder end 122 moves from BDC to TDC, the precompression plate 128 draws air and fuel into the precompression chamber 170 through reed valve 115. Then, as the cylinder end 122 moves from TDC to BDC, the precompression plate 128 compresses the gasses in the precompression chamber 170 until the cylinder 120 moves far enough to open the intake ports 124. Approximately as the intake ports 124 open, an exhaust valve assembly 116 also opens (shown in the open position in the lower-right combustion chamber 118 of FIG. 2), and the compressed gasses from the precompression chamber 170 are forced into the combustion chamber 118, thereby also scavenging the exhaust gasses out of the combustion chamber 118 through the exhaust ports 126.

The size of the precompression chamber 170 is a design choice allowing the designer to optimize the performance of the engine 100. It will be appreciated that the precise timing of the opening and closing of the intake ports 124 and exhaust valve assembly 116 will typically be selected to optimize particular aspects of the performance of the engine 100.

Another optional aspect of the engine 100 is a combustion gas recovery system that utilizes a portion of the energy in the exhaust gasses to assist in driving the cylinder 120, as discussed below, and described in more detail in U.S. Pat. Publ. No. 2004/0159291. Referring still to FIG. 2, rotary valves 180 are shown that control the flow of the exhaust gasses from the exhaust port 126. The rotary valves 180 in the disclosed engine 100 are driven by the rotary valve pulleys 106 discussed above, and shown in FIG. 1. Although the rotary valve mechanism is currently preferred, it is well within the average skill in the art to employ any number of alternative valve drive mechanisms, without departing from the present invention.

The combustion gas recovery system provides a novel mechanism for utilizing some of the energy in the exhaust gas stream to increase the efficiency of the engine 100. Referring again to FIG. 2, as the reciprocating cylinder 120 moves from the top dead center position shown with respect to the upper left piston assembly 150, the precompression plate 128 sweeps through the precompression chamber 170 compressing the air and gas mixture disposed below the precompression plate 128, for pressurized injection when the intake ports 124 open. During this portion of the stroke, the opposite end 122 of the cylinder 120 is moving from BDC to TDC, compressing the air/fuel mixture in the opposite combustion chamber 118. As shown in FIG. 2, at a design position in the cylinder 120 stroke the exhaust ports 126 are fluidly connected to a combustion gas passageway 174, and to the rotary valve 180, such that the hot and pressurized exhaust gasses are selectively ported to the precompression chamber 170, on the outboard side of the precompression plate 128. The hot combustion gasses, therefore, provide a relatively high pressure to the precompression plate 128, and hence to the cylinder 120, thereby assisting in the compression stroke of the cylinder 120, and increasing the efficiency of the engine 100. As one end 122 of the reciprocating cylinder 120 moves from the BDC position to the TDC position, the rotary valve 180 is positioned such that the exhaust gasses on the outboard side of the precompression chamber 170 are expelled through the exhaust manifold 112.

As described in the incorporated patents, including U.S. Pat. No. 6,598,567, the reciprocating motion of the cylinder 120 is converted to rotary motion and extracted to produce useful work using a crank cam 190. The crank cam 190 is essentially a crankshaft with one or more integral cam lobes 192. The crank cam 190 rotates about an axis of rotation and orbits about an axis parallel to, and offset from, the axis of rotation. The combined rotational and orbital motion results in a linear reciprocating motion in the crank of the crank cam 190. The cam lobes 192 engage the exhaust valve assembly 116, opening the exhaust valve assembly 116 to permit the combustion product exhaust gasses to be expelled from the combustion chamber 118 at the appropriate time.

Catalytic converters are known in the art, and are used to reduce the emission of undesirable gasses from combustion engines. Typically, a catalytic converter will reduce nitrogen oxides, carbon monoxide, and/or unburnt hydrocarbons from the exhaust gas stream. In general, catalytic converters use a catalyst, such as platinum, palladium or rhodium, to initiate a reaction reducing the unwanted gasses. The catalytic reactions are typically exothermic, generating significant quantities of heat.

To further improve the efficiency of the engine 100, a catalytic converter 172 may be provided in the precompression chamber 170, outboard of the precompression plate 128, and positioned to receive the combustion gasses therethrough. The catalytic converter 172 provides an environment for a chemical reaction wherein combustion byproducts are converted to less-toxic gases, generally in an exothermic reaction. In the process of reducing unwanted emissions, the catalytic converter produces significant quantities of heat. In prior art engines, the thermal energy generated in a catalytic converter has been expelled without providing any benefit to the work output of the engine. In the engine 100, the catalytic converter 172 not only reduces unwanted emissions, but also heats the exhaust gasses in the precompression chamber 170, outboard of the precompression plate 128, thereby increasing the back pressure and providing useful work by assisting in the compression stroke of the cylinder 120.

Figure 3A:
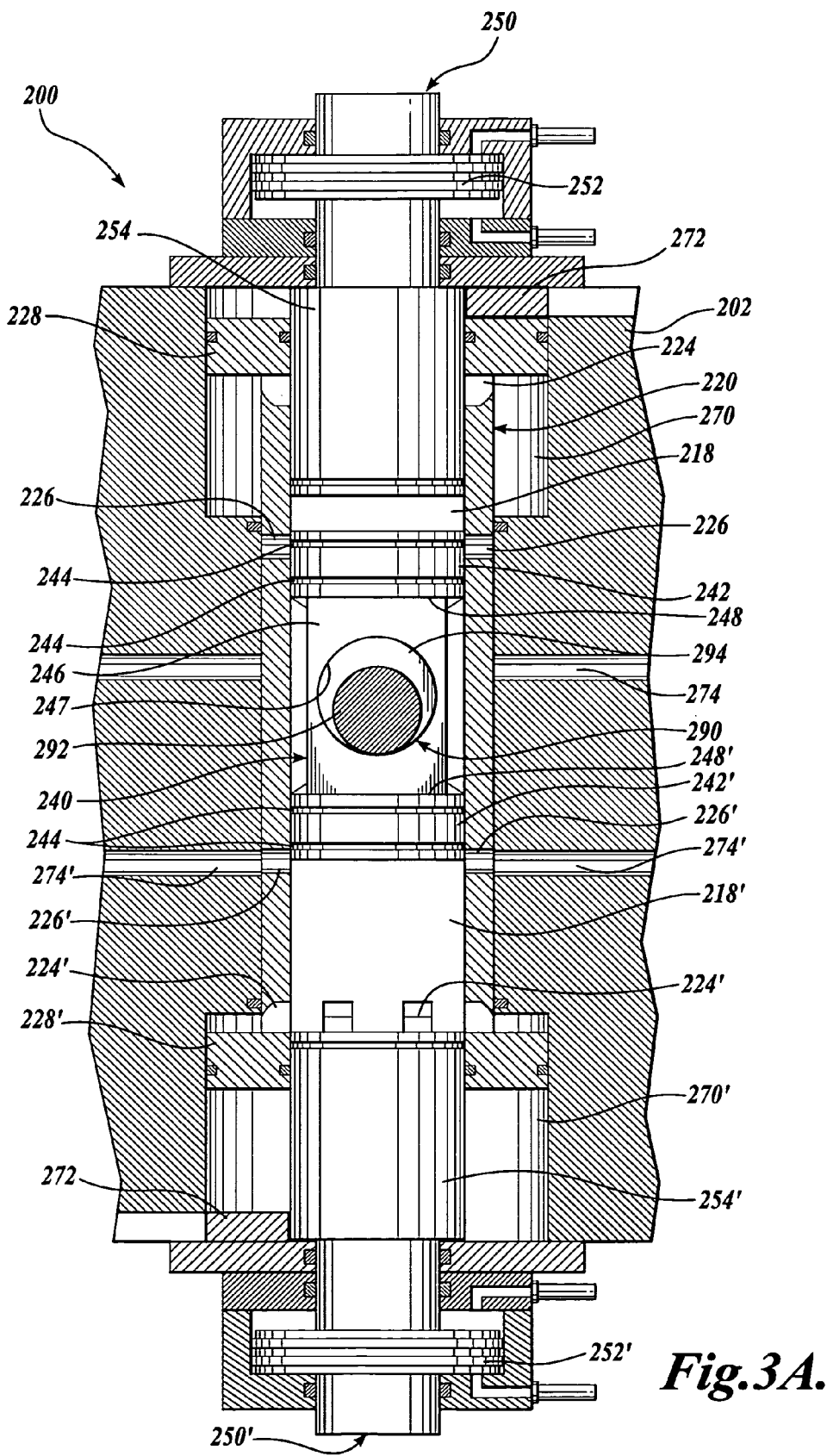
FIGS. 3A-3C show a cross sectional view through a portion of a second embodiment of an engine in accordance with the present invention, showing a reciprocating cylinder and central piston at different positions in the stroke cycle.
Figure 3B:
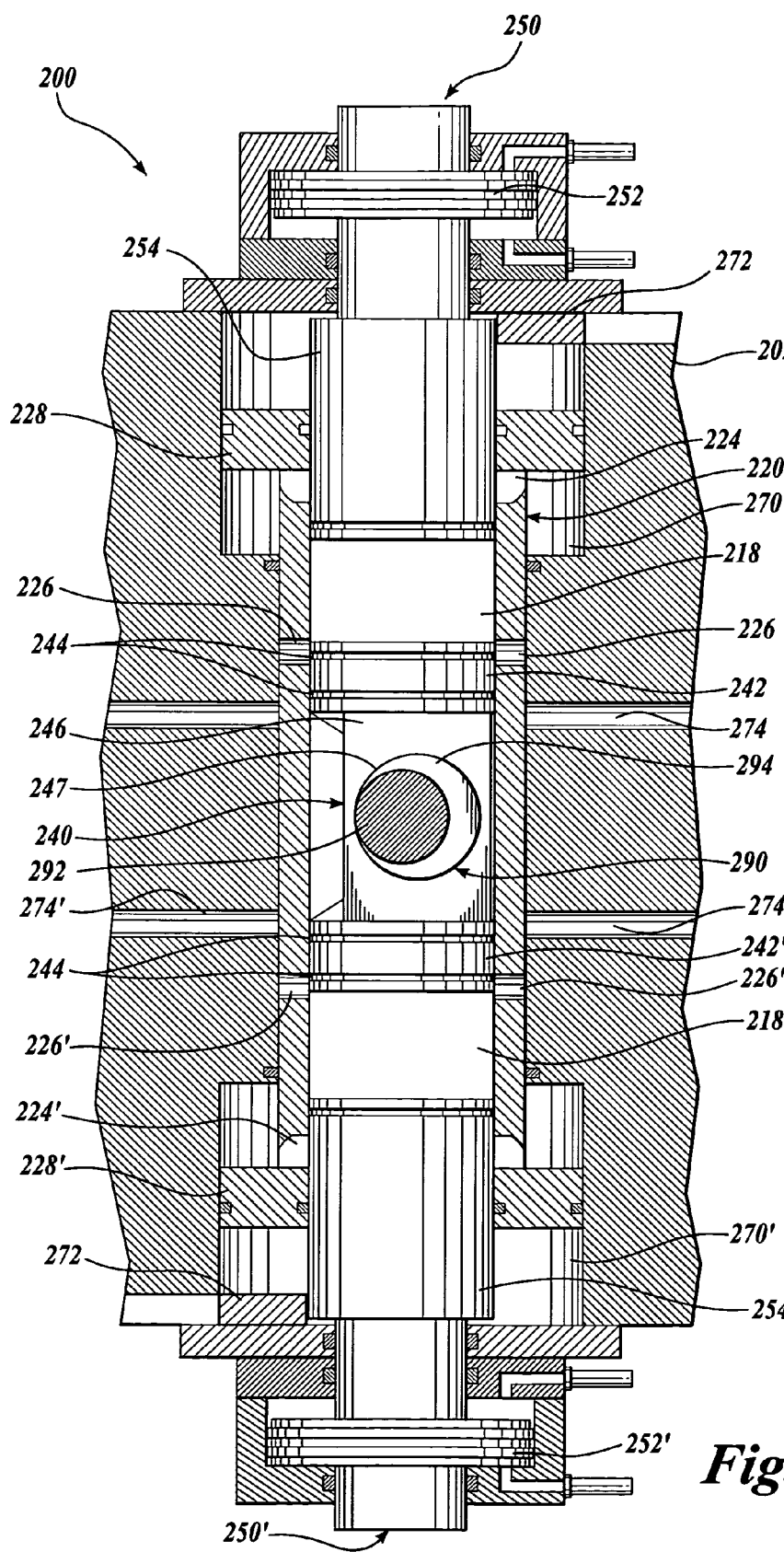
Figure 3C:
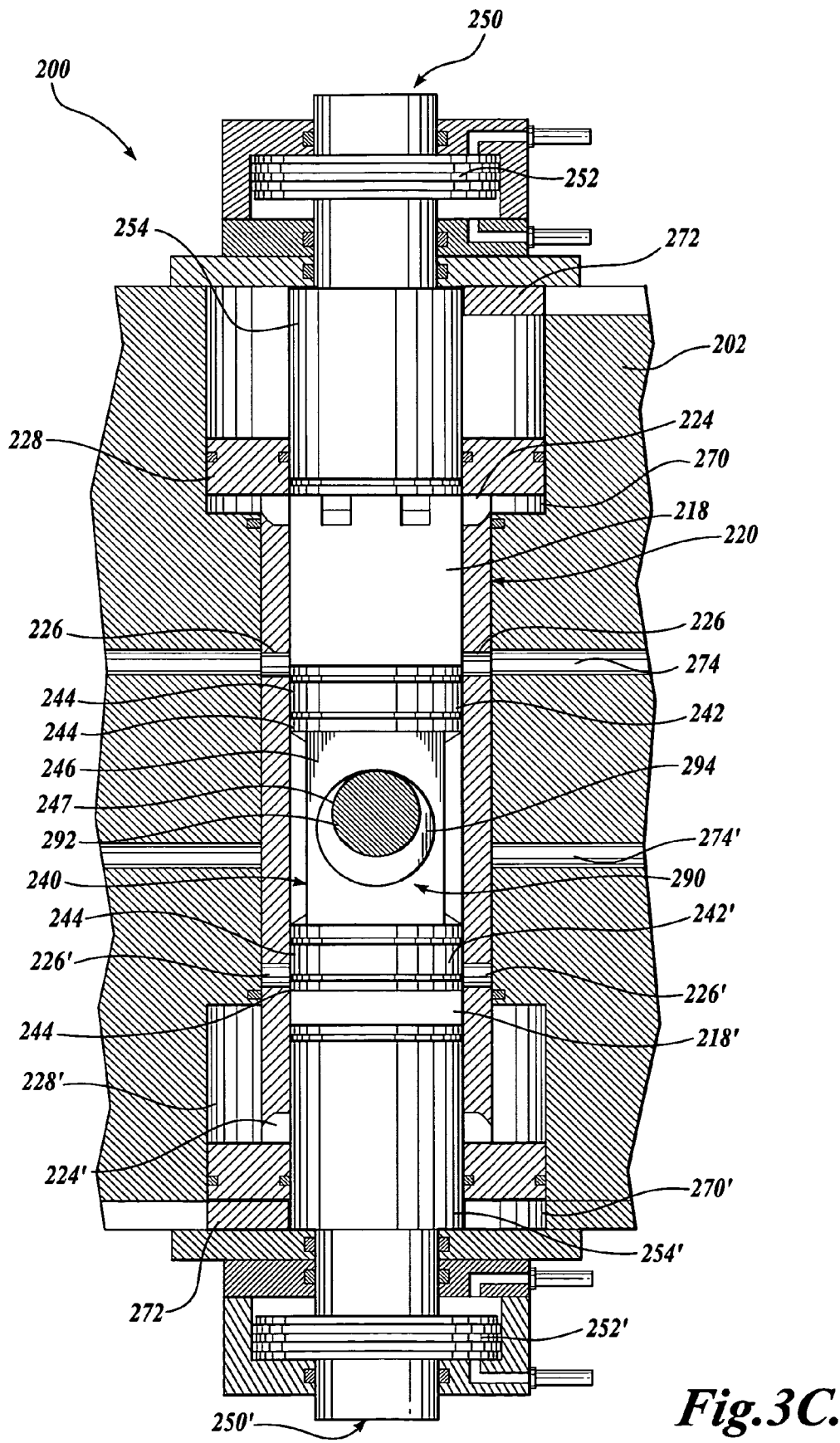

Another embodiment of an engine 200 according to the present invention is shown in FIGS. 3A-3C. The engine 200 is similar to the engine 100 described above, and for brevity and clarity those aspects of the engine 200 that have already been described will not be repeated. FIGS. 3A-3C show a partially cut-away cross-section of a portion of the engine 200 taken through a reciprocating cylinder 220 that is slidably disposed in the engine block 202. It is contemplated that the engine 200 may include more than one reciprocating cylinder 220, and that cylinders 220 may be oriented transversely with respect to each other, similar to the previously described engine 100. The reciprocating cylinder 220 slidably engages oppositely disposed piston assemblies 250, 250', and define intake ports 224, 224'. The piston assemblies 250, 250' may be controllable, for example by hydraulic means, to modify the compression ratio in the cylinder 220 by selectively moving the movable pistons 254, 254', for example using hydraulic pressure on control plates 252, 252', as discussed above with reference to engine 100.

The reciprocating cylinder 220 includes annular precompression plates 228, 228' that are slidably disposed in precompression chambers 270, 270' to pre-compress the air or air/fuel mixture for injection into the associated combustion chamber 218, 218' through intake ports 224, 224'.

In this embodiment a central piston assembly 240 is slidable in the bore of the reciprocating cylinder 220, approximately midway along the length of the cylinder 220. The central piston assembly 240 includes oppositely disposed piston heads 242, 242' that face associated piston assemblies 250, 250', respectively. Each piston head 242, 242' has one or more sealing element (two shown), for example conventional piston rings 244 that slidably engage the reciprocating cylinder 220.

The central piston assembly 240 is adapted to reciprocate within the cylinder 220 in a periodic cycle that is synchronized with the reciprocating motion of the cylinder 220. For example, as the cylinder 220 moves towards the upper piston assembly 250, the piston head 242 moves upwardly within the cylinder 220 towards the upper piston assembly 250. Therefore, the piston head 242 moves towards the upper piston assembly 250 faster than the cylinder 220 speed. Similarly, as the cylinder 220 moves towards the lower piston assembly 250' the lower piston head 242' moves within the cylinder 220, such that the lower piston head 242' moves towards the lower piston assembly 250' faster than the cylinder 220 speed. It will be readily apparent that the particular synchronization or timing of the central piston assembly 240 with respect to the cylinder 220 may be selected to optimize the engine 200 performance.

It should now be appreciated that the cylinder 220 motion and the central piston assembly 250 motion combine to produce an effective stroke length that is greater than the stroke length of the cylinder 220 alone. For example, in one embodiment the cylinder stroke length is 48 mm and the central piston assembly stroke length is 17 mm, which combine to produce an effective compression stroke length of 65 mm. However, the relative speed of the cylinder 220 with respect to the pistons 254, 254' and with respect to the engine block 202 is determined only by the relatively short 48 mm stroke, and the relative speed of the central piston assembly 250 with respect to the cylinder 220 is based only on the 17 mm stroke length. There is no component-to-component relative speed that "sees" the longer 65 mm stroke length. This provides many advantages to the engine 200, for example permitting a longer effective stroke length, easing lubrication requirements, and avoiding undue wear on engine components.

The cylinder 220 includes upper and lower exhaust ports 226, 226' through the cylinder 220, that are positioned to align with combustion gas passageways 274, 274' in the engine block 202 at a desired time in the cycle. The motion of the central piston assembly 240 opens and closes or covers the exhaust ports 226, 226', as discussed below. An advantage of this embodiment is that the exhaust valve assembly 116 shown in FIG. 2 is not required.

It is contemplated that the combustion gas passageways 274 may be selectively connectable to an associated precompression chamber 270, 270' on the outboard side of the precompression plate 228 to improve the engine efficiency, as discussed above. Also, catalytic converters 272 may be included to reduce undesirable exhaust emissions and to further preheat the gasses in the precompression chamber 270, in the manner described above.

Figure 4:
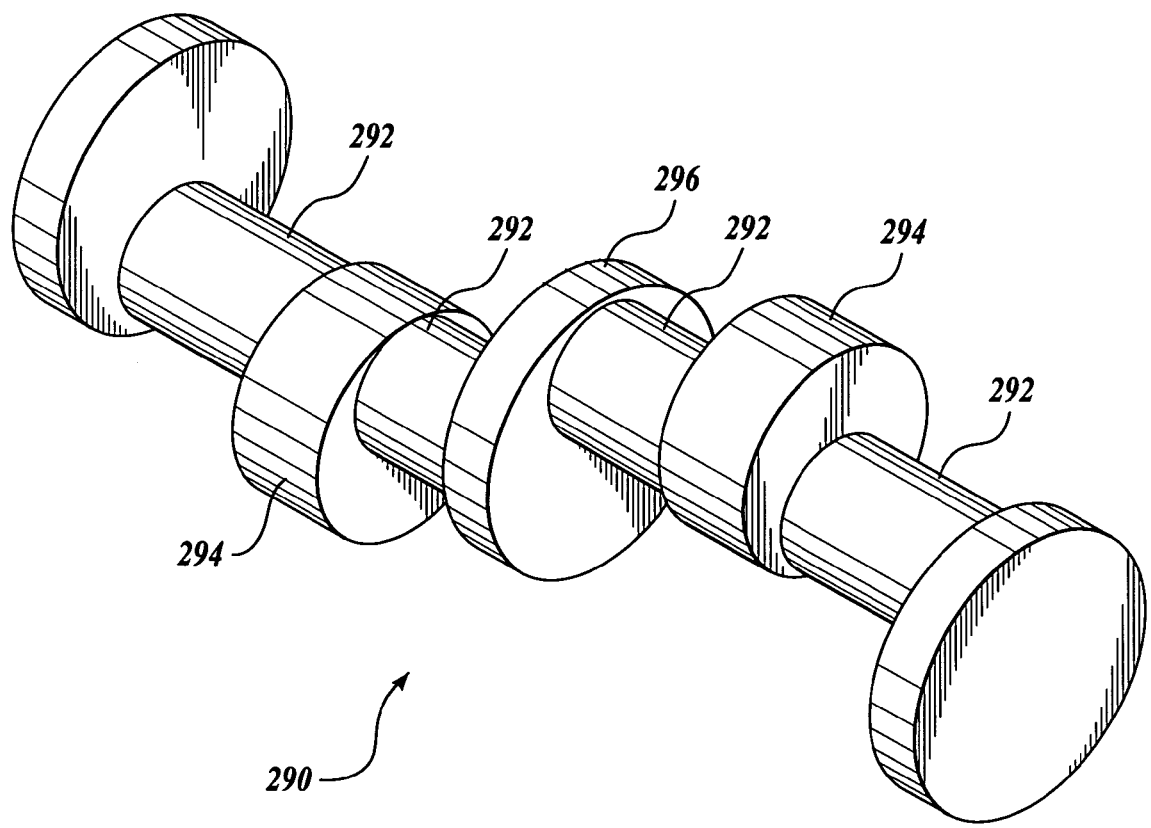
FIG. 4 shows a crank shaft for the engine shown in FIGS. 3A-3C.

The cylinder 220 and the central piston assembly 240 are drivably connected to a crankshaft 290. FIG. 4 shows a perspective view of the crankshaft 290, which in this exemplary embodiment includes four cylinder journals 292 with an intermediate crank web 296, and adapted for use in an engine having two reciprocating cylinders 220. It will be apparent that the crankshaft 290 may be modified in a straightforward manner to use a different number of cylinder journals 292 and accommodate a different number of cylinders 220.

As discussed above, to accommodate and utilize the linear reciprocating motion of the cylinders 220, the crankshaft 290 rotates about a first axis, and orbits about a second axis that is parallel to the first axis, as discussed in detail in the incorporated patents. The combined rotational and orbital motion results in substantially linear reciprocating motion of the cylinder journals 292.

Each pair of cylinder journals 292 includes an offset piston journal 294 with a circular outer surface having an axis of symmetry offset from the associated cylinder journal 292 axes. Refer now also to FIG. 3A. The central piston assembly 240 includes a gliding block bearing 246 disposed between, and connecting, the upper and lower piston heads 242, 242'. (Intermediate structure connecting the upper piston head 242 to the lower piston head 242' is removed for clarity.) A central bearing surface 247 slidably engages the offset piston journal 294, and upper and lower bearing surfaces 248, 248' slidably engage the piston heads 242, 242'. Therefore, as the journal 292 rotates and reciprocates, the offset piston journal 294 causes the gliding block bearing 246 to move in a circular path relative to the journal 292. Therefore, the central piston assembly 240 will move axially within the cylinder 220, reciprocating relative to the cylinder 220 to produce the piston head 242, 242' motion described above.

FIG. 3A shows a fragmentary cross-sectional view of the engine 200 when the upper combustion chamber 218 is approximately at TDC. FIG. 3B shows the same view, but with the reciprocating cylinder 220 at an intermediate position, and FIG. 3C shows the same view, but with the lower combustion chamber 218' near TDC.

When the upper combustion chamber 218 is near TDC, the upper intake ports 224 are closed by the upper piston 254, and the upper exhaust ports 226 are closed by the central piston assembly 240 (upper piston head 242). The central piston assembly 240 is also near its uppermost position within the cylinder 220. The lower combustion chamber 218' is near BDC, and the intake ports 224' are open, such that the precompressed air/fuel mixture enters the lower combustion chamber 218', and the lower exhaust ports 226' are uncovered by the lower piston head 242', so that the incoming gasses scavenge the lower combustion chamber 218'.

Figure 5:
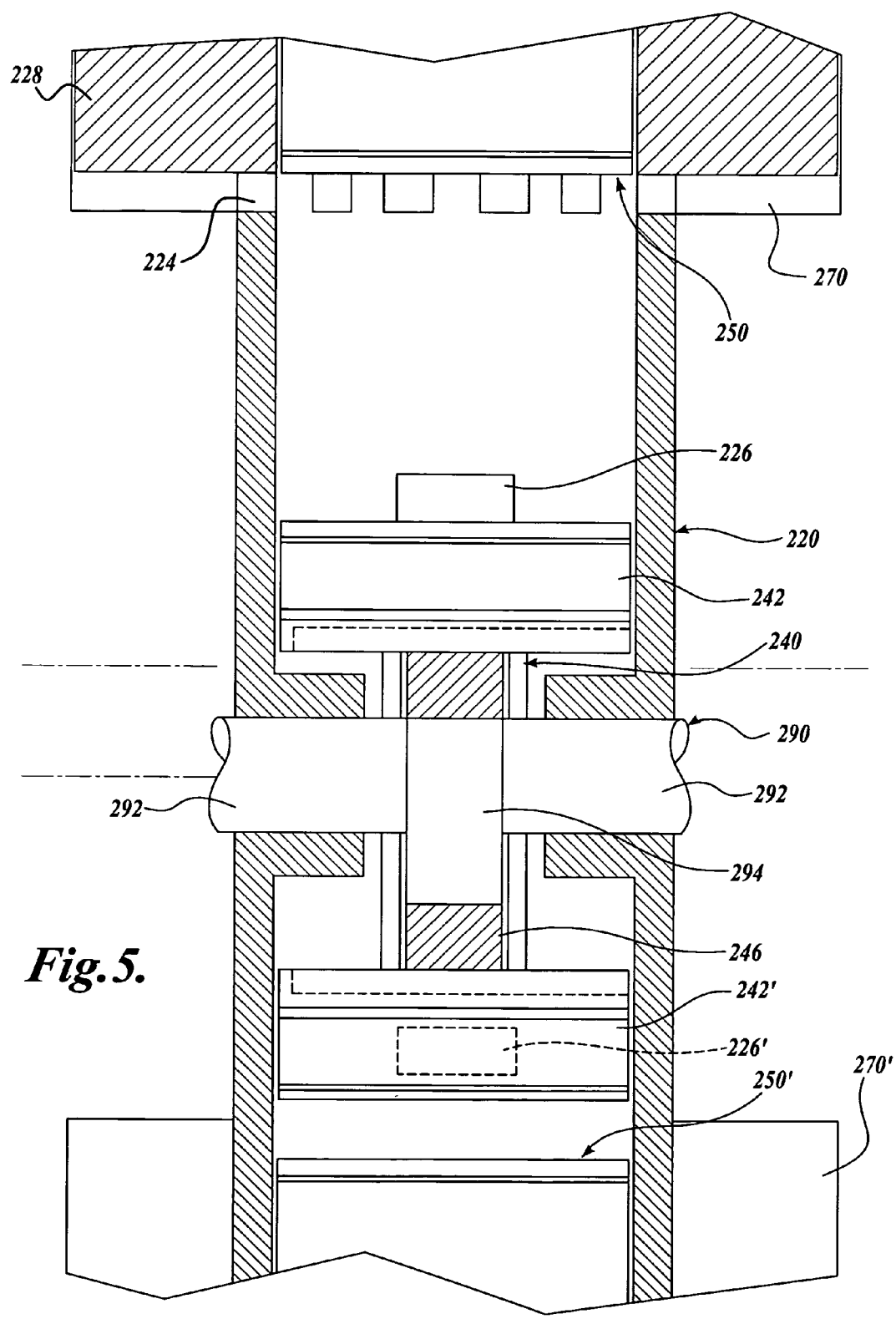
FIG. 5 shows a fragmentary cross-sectional side view of the engine shown in FIGS. 3A-3C, showing details of the connection between the crankshaft and the central piston assembly.

FIG. 5 shows a fragmentary cross-sectional side view of the engine shown in FIGS. 3A-3C, rotated ninety degrees about a vertical axis, and showing details of the connection between the crankshaft and the central piston assembly. In this view it can be seen that the offset piston journal 294 engages the gliding block bearing 246, and the cylinder journals 292 engage the cylinder 220. As the crankshaft 290 rotates and orbits to produce a substantially linear reciprocating motion in the cylinder journals 292, the offset piston journal 294 will result in reciprocating motion of the central piston assembly 240 relative to the cylinder 220.

While illustrative embodiments have been illustrated and described, it will be appreciated that various changes can be made therein without departing from the spirit and scope of the invention.

The embodiments of the invention in which an exclusive property or privilege is claimed are defined as follows:

1. An internal combustion engine comprising:
    an engine block having a cylindrical aperture therethrough, the cylindrical aperture having an enlarged first end portion defining a first precompression chamber and an enlarged second end portion defining a second precompression chamber;
    a first piston coupled to the block at the first precompression chamber and a second piston coupled to the block at the second precompression chamber;
    a cylinder having open ends and slidably disposed in the cylindrical aperture for reciprocating motion, the cylinder having a first combustion chamber that slidably engages the first piston and a first precompression member extending into the first precompression chamber, and a second combustion chamber that slidably engages the second piston and a second precompression member extending into the second precompression chamber;
    a first intake port fluidly connecting the first precompression chamber to the first combustion chamber and a second intake port fluidly connecting the second precompression chamber to the second combustion chamber;
    a first exhaust valve from the first combustion chamber and a second exhaust valve from the second combustion chamber; and
    a crankshaft drivably attached to the cylinder and adapted to convert the reciprocating motion of the cylinder into rotary motion;
    wherein the cylinder further comprises a central piston assembly disposed in the cylinder between the first combustion chamber and the second combustion chamber, such that the central piston assembly reciprocates with respect to the reciprocating cylinder.

2. The engine of claim 1, further comprising a first passageway fluidly connecting the first exhaust valve to the first precompression chamber, outboard of the first precompression member, and a second passageway fluidly connecting the second exhaust valve to the second precompression chamber, outboard of the first precompression member.

3. The engine of claim 2, further comprising a recovery system valve operable to selectively control the fluid connection between the first passageway and the first precompression chamber.

4. The engine of claim 3, wherein the recovery system valve is a rotary valve.

5. The engine of claim 2, further comprising a first catalytic converter disposed in the first precompression chamber and fluidly connected to the first passageway, and a second catalytic converter disposed in the second precompression chamber and fluidly connected to the second passageway.

6. The engine of claim 1, wherein the reciprocating central piston assembly is substantially synchronized with the reciprocating motion of the cylinder such that the central piston assembly moves within the cylinder in the same direction as the motion of the cylinder.

7. The engine of claim 1, wherein the reciprocating motion of the central piston assembly produces an effective stroke that is greater than a stroke of the cylinder.

8. The engine of claim 1, wherein the exhaust valves comprise apertures through the cylinder that are periodically closed by the central piston assembly.

9. The engine of claim 1, wherein the crankshaft further comprises an offset piston journal, and the central piston assembly further comprises a gliding block having a circular aperture slidably receiving the offset piston journal.

10. The engine of claim 1, wherein the first and second pistons are adjustably coupled to the block such that the engine compression ratio can be varied during operation of the engine.

11. The engine of claim 10, wherein the first and second pistons are connected to hydraulically operated control plates such that the axial position of the first and second pistons are hydraulically controlled.

12. An internal combustion engine comprising:
    an engine block having a cylinder slidably disposed therein for reciprocating motion, the cylinder having an axis and first and second ends;
    first and second pistons aligned with the cylinder axis and positioned such that the first piston slidably engages the first end of the cylinder and the second piston slidably engages the second end of the cylinder;
    a central piston assembly slidably disposed in the cylinder between the first and second pistons, the central piston assembly including a pair of oppositely disposed piston heads, each piston head facing an associated one of the first and second pistons, wherein the central piston assembly reciprocates with respect to the reciprocating cylinder;

a crankshaft drivably connected to the cylinder through cylinder journals, the crankshaft having an offset piston journal that engages the central piston assembly such that central piston assembly reciprocates within the reciprocating cylinder.

13. The engine of claim 12, wherein the first piston and central piston assembly define a first combustion chamber; and the second piston and central piston assembly define a second combustion chamber, and further wherein the reciprocating motion of the central piston assembly is substantially synchronized with the reciprocating motion of the cylinder, producing an effective stroke length that is greater than the length of the cylinder reciprocating motion.

14. The engine of claim 13, wherein the first piston extends into a first precompression chamber, and the second piston extends into a second precompression chamber, and wherein the cylinder further comprises a first precompression plate at the cylinder first end that sealingly engages the first precompression chamber, and an annular second precompression plate at the cylinder second end that sealingly engages the second precompression chamber, and wherein the first and second precompression plates compress gasses for injection into the first and second combustion chambers, respectively.

15. The engine of claim 14, wherein at least a portion of the exhaust gasses produced by the engine are channeled to the first and second precompression chambers.

16. The engine of claim 15, further comprising first and second catalytic converters disposed in the first and second precompression chambers, respectively.

17. An internal combustion engine comprising:
an engine block;
a reciprocating cylinder disposed in the engine block, the reciprocating cylinder having opposite ends comprising first and second combustion chambers;
first and second piston means attached to the engine block and slidably engaging the reciprocating cylinder;
a central piston assembly means slidably disposed in the reciprocating cylinder and adapted to reciprocate with respect to the reciprocating cylinder; and
air delivery means for injecting compressed air into the first and second combustion chambers;
wherein the central piston means reciprocates synchronously with the reciprocating cylinder.

18. The engine of claim 17, wherein the reciprocating cylinder further comprises annular compression plates adapted to pre-compress gasses for injection into the first and second combustion chambers.

19. The engine of claim 18, further comprising an exhaust gas recovery means including a catalytic converter for extracting energy from exhaust gasses to produce a pressure on the compression plates.

20. The engine of claim 17, further comprising a crankshaft having an offset piston journal that engages the central piston assembly.

21. The engine of claim 17, wherein the first and second piston means are adjustably attached to the engine such that the compression ratio in the first and second combustion chambers are variable.

22. The engine of claim 17, further comprising a second reciprocating cylinder having associated first and second piston means, the second reciprocating cylinder being oriented transversely to the first reciprocating cylinder.

\* \* \* \* \*